Sept. 26, 1933.    R. STRESAU    1,928,141
FEED MILL
Filed March 2, 1929    4 Sheets-Sheet 1
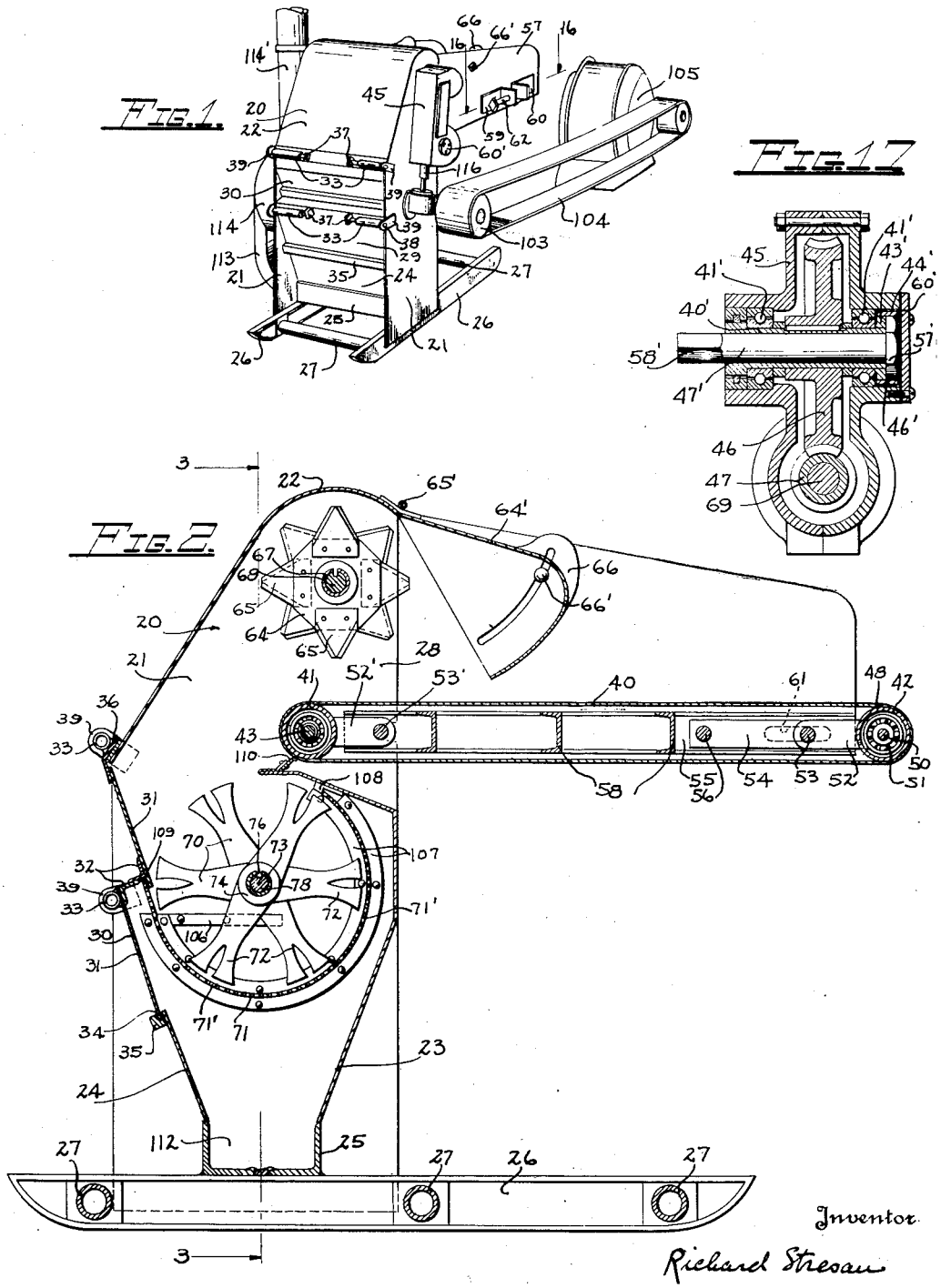

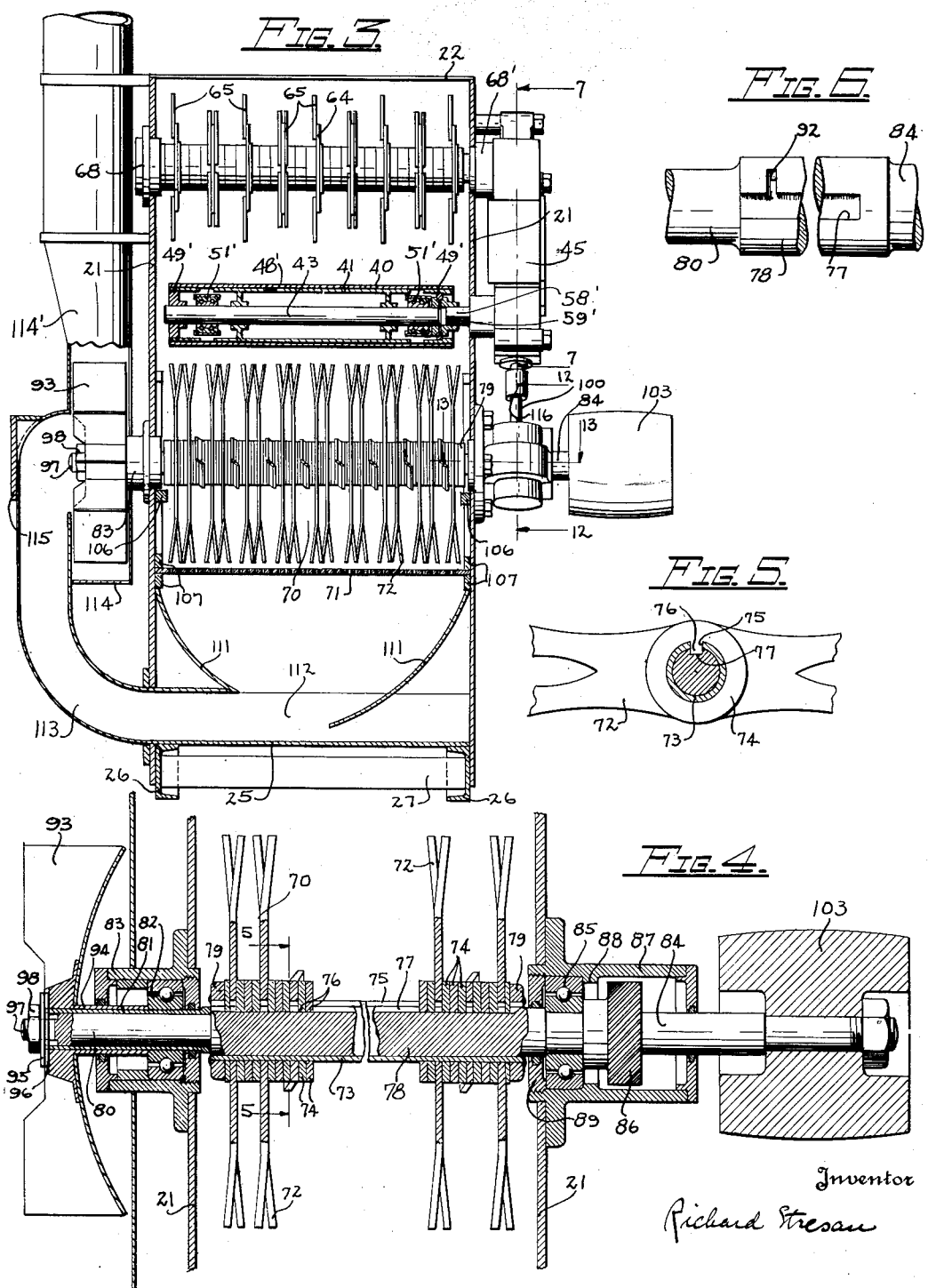

Sept. 26, 1933.  R. STRESAU  1,928,141
FEED MILL
Filed March 2, 1929  4 Sheets-Sheet 3
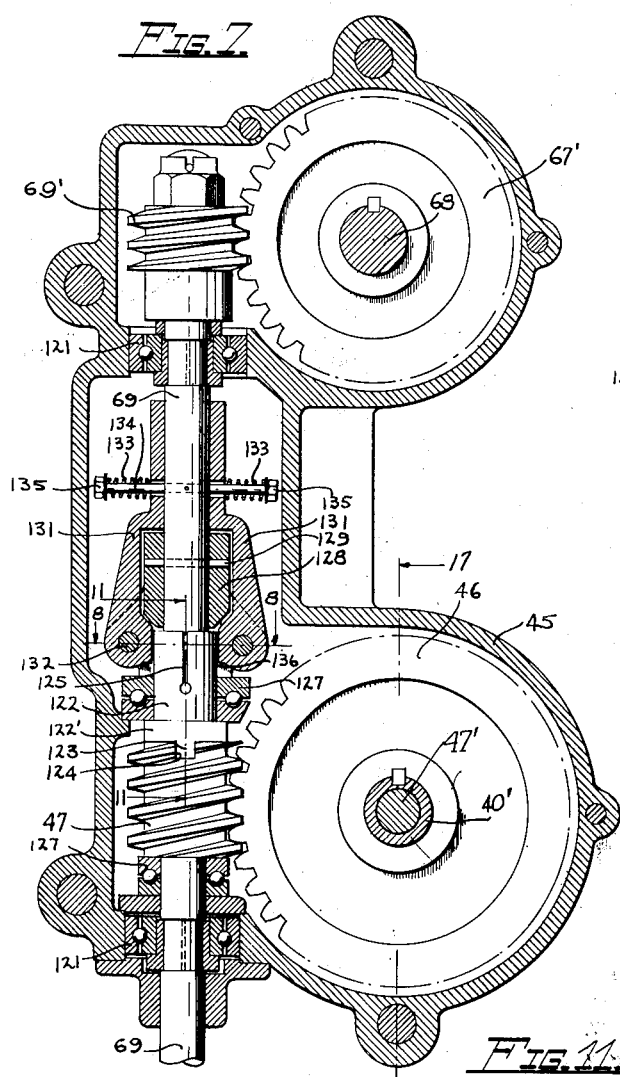

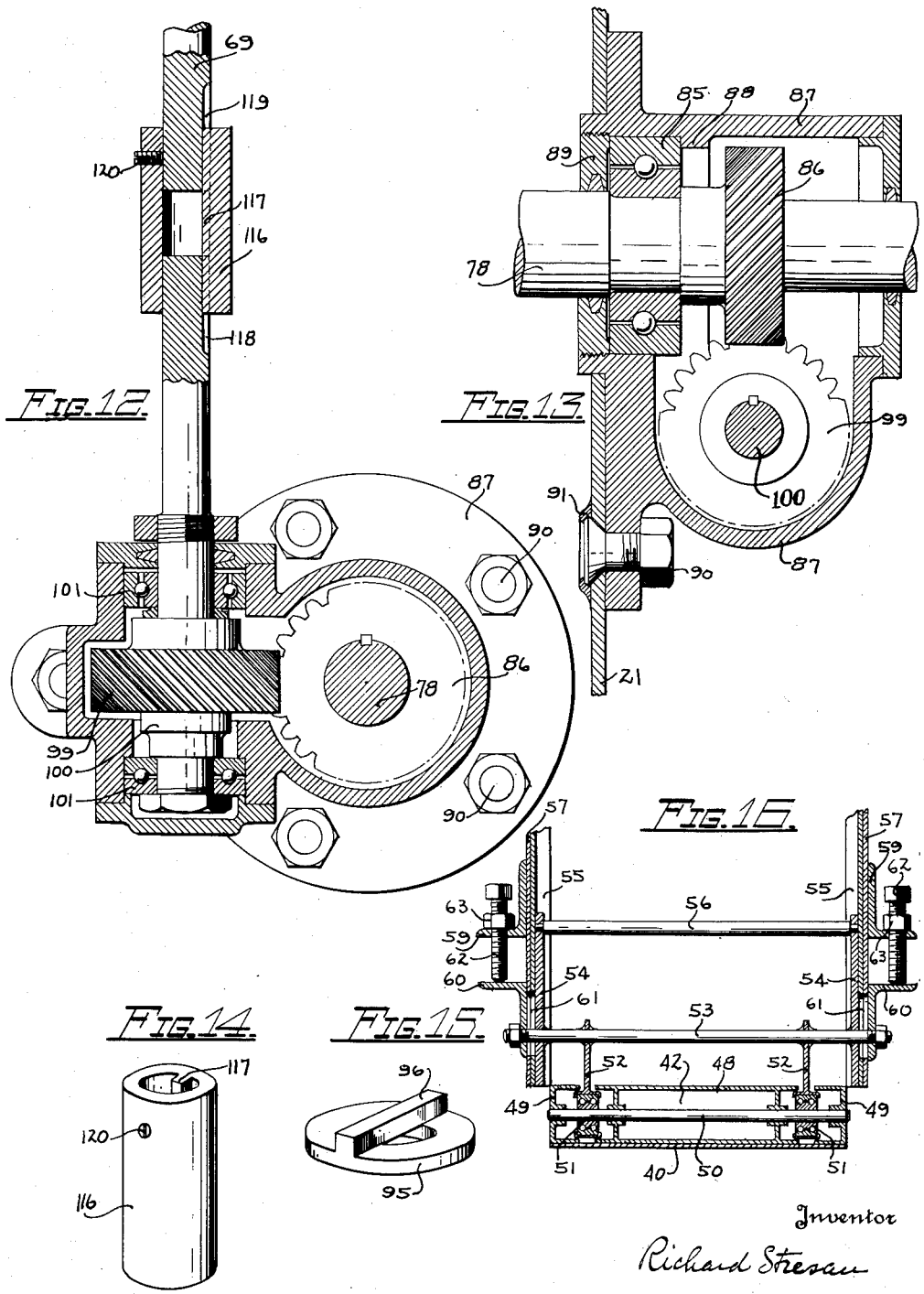

Patented Sept. 26, 1933

1,928,141

UNITED STATES PATENT OFFICE 1,928,141

FEED MILL

Richard Stresau, Wauwatosa, Wis., assignor to Swifton Manufacturing Company, West Allis, Wis., a corporation of Wisconsin Application March 2, 1929. Serial No. 344,018

3 Claims. (Cl. 146—79)

The invention relates to a feed mill for cutting fodder or grinding grain or other similar purposes.

Heretofore in devices of this character, in order to remove the beater or cutter the housing and bearings were split. Such constructions are clumsy and, because of the weight of the parts, difficult to handle and there is liability of misalignment of the bearings. In order to overcome the above difficulties one object of the present invention is to provide a unitary housing from which the cutter shaft is removable from one side of the machine, permitting ready removal of the cutter or beater from the housing.

In machines of the character above described, when cutting fodder, overfeeding clogs the cutter and reduces its speed below the proper cutting speed and to prevent clogging and to permit the cutter to operate at its best cutting speed another object of this invention is to provide means governed by the speed of the cutter for stopping the drive of the feed mechanism when said cutter tends to reduce its speed.

A further object of this invention is to provide a cutter or beater construction that is simple in construction and readily assembled on the drive shaft.

A further object of the invention is to provide a machine in which the abrading screen extends more than half way around the beater or cutter so that the capacity of the machine is greatly increased over former constructions.

Further objects of the invention are to improve generally on machines of this type by the manner of constructing the casing or housing, the tensioning means for the feed belt and the arrangement and mounting of the suction fan and the conveyor.

Briefly considered the machine includes a unitary casing structure in which the side plates are rigidly secured to adjacent end plates and in which the shafts for the feed reducing members are mounted in bearing journals on these side plates, one of these bearing journals for each shaft being detachably secured to its supporting side plate and removable with the shaft journalled in it on an endwise movement of said shaft from the casing. Each of the feed reducing members has a releasable drive connection with its shaft whereby on the removal of the shaft the feed reducing member may be removed through an opening in the casing between the side plates. One feed reducing member instanced here as a cutter is mounted in the upper part of the casing and above a conveyor that carries material into the casing while the other feed reducing member instanced here as provided with beater blades is mounted in the casing below the delivery end of the conveyor and cooperates with a screen in the usual manner to reduce the feed material. Both of these feed reducing members are connected together through shafts and gearing and power is applied to one of them whereby they are both continuously driven through the reducing member mounted in the upper part of the casing may be disconnected from its drive through a releasable coupling connection between certain of the power transmission shafts. The conveyor is driven from the same source of power but according to the present invention the conveyor drive is adapted to be connected to the main driving mechanism through a governor operated clutch which connects the conveyor drive to one of the continuously driven shafts of the machine when said shaft is rotating at or above a predetermined speed and which disconnects the conveyor drive from said shaft when said shaft is rotating below a predetermined speed. Also each of the feed reducing members includes a novel association of elements assembled together to form a unit that may be readily removed from its drive shaft, each of these units embodying a sleeve upon which the feed reducing blades and spacers mounted between the blades are mounted, these spacers having keyed connection with said sleeve and with a keyway in the drive shaft and one of these spacers having a key projection adapted to be moved into a key slot in the shaft extending at right angles to the main key way in said shaft so as to lock the unit against longitudinal movement relative to said shaft.

The invention further consists in the several features hereinafter set forth and more particularly defined by claims at the conclusion hereof.

In the drawings Fig. 1 is a perspective view of a machine embodying the invention;

Fig. 2 is a vertical sectional view through said machine;

Fig. 3 is a transverse vertical sectional view taken on the line 3—3 of Fig. 2;

Fig. 4 is a detail sectional view through the cutter or beater shaft;

Fig. 5 is a detail sectional view taken on the line 5—5 of Fig. 4, parts being broken away;

Fig. 6 is a detail view of the cutter or beater drive shaft, parts being broken away;

Fig. 7 is a detail vertical sectional view taken on the line 7—7 of Fig. 3;

Fig. 8 is a detail sectional view taken on the line 8—8 of Fig. 7;

Fig. 9 is a detail side elevation view of the governor assembly;

Fig. 10 is a perspective view of the feed clutch member;

Fig. 11 is a detail sectional view taken on the line 11—11 of Fig. 7;

Fig. 12 is a detail sectional view taken on the line 12—12 of Fig. 3;

Fig. 13 is a detail sectional view taken on the line 13—13 of Fig. 3;

Fig. 14 is a perspective view of the shaft coupling;

Fig. 15 is a perspective view of the fan locking collar;

Fig. 16 is a horizontal sectional view taken on the line 16—16 of Fig. 1;

Fig. 17 is a detail sectional view taken on the line 17—17 of Fig. 7.

Referring to the drawings the casing 20 is formed as a unitary structure having side plates 21, upper cover plate 22, front plate 23 and lower rear plate 24, the plates 22, 23 and 24 preferably being welded to the side plates 21 and the plates 23 and 24 being welded to a channel frame member 25 which, with the lower ends of the side plates 21, is welded to metal skids or runners 26 having tubular tie bars 27 welded thereto. This casing is provided with a front opening 28 and a rear opening 29. The opening 29 is normally covered by a removable door 30 which is formed if plates 31, angles 32 and tubes 33. The lower end of said cover fits in a recess 34 provided in a bar 35 welded or otherwise suitably secured to the upper end of the plate 24, while the upper end 36 of the cover rests against the lower end of the cover plate 22. The cover fits snugly between the side plates 21 and is secured in closed position by bolts 37 slidably mounted in the tubes 33 and engageable with openings 38 in ears or lugs 39 welded to the side plates. The term "unitary casing" is used to distinguish this construction from the usual split casings and is not to be limited to a casing whose parts are secured together by welding.

For feeding the material into the machine an endless conveyor 40 is provided, preferably in the form of a belt of heavy canvas or other suitable material running over a driven roller 41 and an idler roller 42. The roller 41 is formed in sections, as hereinafter described, and is driven from a shaft 47' mounted in a gear case 45 and associated with a worm-wheel 46 meshing with a worm 47, see Figs. 2, 3, 7 and 17.

As shown in Fig. 16, the roller 42 is made up of a main part 48 and end parts 49 which are fixed to the shaft 50 and as shown in Fig. 3 the roller 41 is made up of main part 48' and end parts 49' which are fixed to a shaft 43. In each instance between these parts of the rollers the shaft 50 or 43 is mounted in ball-bearing journals 51 or 51' whose outer races are connected to bracket arms 52 or 52' extending through the space between sections of the roller assembly and welded or otherwise suitably secured to a shaft or bar 53 or 53'. The bar 53' extends through the conveyor frame bars 55 and is detachably bolted to the side plates 21. This particular arrangement and construction of the conveyor unit will form the subject matter of a separate application. The bar 53 is welded to side plates 54 slidably mounted in the side channel frame bars 55 and connected to a reinforcing tie-rod 56. The bars 53 and 53' detachably connect the conveyor frame bars 55 to the side chute plates 57 and the removal of the nuts on these bars permits the whole conveyor assembly being removed as a unit from the main frame of the machine. The bars 55 are further reinforced by transversely disposed channel bars 58. A lug 59 is welded or otherwise suitably secured to the supporting frame and similar lugs 60 are secured to extensions of the shaft 53 which are also slidably mounted in slots 61 in said frame. Bolts 62 in threaded engagement with the lugs 59 adjustably engage the lugs 60 to move the outer roller 42 to a position to properly tension the conveyor belt and are secured in adjusted position by locknuts 63.

For driving the conveyor the worm-wheel 46 is, as shown in Fig. 17, keyed to sleeve 40' journalled in bearings 41' in the case 45 and has a nut 43' secured thereto to which a sleeve 44' having a nut socket 46' is firmly secured. A shaft 47' extends loosely through said sleeve and a nut-shaped end 57' fitting in said socket 46' whereby it is driven by said sleeve and has a squared end 58' engaging in a square hole 59' formed in the hub of one roller part 49'. A cap 60' is removably secured over the end of the shaft 47'.

The material to be treated is placed upon the conveyor and carried thereby into the machine and where grain is being treated a gauge member 64', as shown in Fig. 2, is used to regulate the feed, said member being in the form of a curved plate hinged at 65' to the main casing and provided with slotted side ears 66 through which bolts 66' pass for adjustably clamping said member to the plates 57.

Where fodder is to be treated it is, on passing into the machine, subjected to the action of a cutter 64 which may be of any suitable construction and includes knives 65 mounted on a tubular shaft 67 which is mounted on a shaft 68 journalled in bearings 68' and having one end extending outside of the housing into the gear case 45 where it is operatively connected by a worm-wheel 67' with a worm-gear 69' secured to a shaft 69. The manner of attaching the cutters 65 to the shaft is preferably the same as that hereinafter described and shown in detail in connection with the cutter or beater 70 that cooperates with the screen 71.

Referring to Figs. 2 to 6, inclusive, the cutter or beater 70 is formed of a plurality of beater, hammer or cutter members 72 that are frictionally held to a hollow shaft or sleeve 73 in spaced relation to each other by a plurality of washers 74. The sleeve shaft 73 has a longitudinally extending slot or keyway 75 therein and each washer has a key projection 76 that extends through said slot and into a keyway 77 on the driven shaft 78. The washers 74 and members 72 are held against longitudinal movement relative to the sleeve 73 by end collars 79 which may be detachably secured thereto in any suitable manner, but which are preferably fixed to said sleeve by welding.

The shaft 78 has a front end portion 80 slidably mounted in a sleeve 81 which in turn is secured to the inner race of a ball bearing journal 82 whose outer race is mounted and held within a bearing block 83 secured to one of the side plates 21. The rear end portion 84 of the shaft 78 is journalled in a ball bearing journal 85 whose inner race is secured to said shaft between a shoulder thereon and the hub of a spiral gear 86 and whose outer race is mounted within a bearing support 87 between a flange 88 thereon and a removable collar 89. The bearing support 87 is detachably secured to the other side plate 21 so as to be removable with said shaft and the bearings 85 by means of studs 90, here shown in Fig. 13 as in the form of machine screws mounted in openings in said plate and whose heads are secured thereto by welding metal 91.

In order to prevent longitudinal movement of the cutter assembly relative to its drive shaft 78 said shaft is provided with a key slot 92 extending at right angles from the keyway 77 in the direction of rotation of said shaft so that the key projection 76 of one of the friction washers 74 may move or be moved into said slot 92, thereby locking the sleeve 73 against longitudinal movement relative to said shaft as shown in Fig. 6.

The suction fan 93 has a tubular hub portion 94 that fits over the sleeve 81 and is clamped to said sleeve and the shaft 78 by the collar 95, shown in Fig. 15, which has a diametrically disposed key 96 that engages in slots in the threaded end 97 of the shaft, the sleeve 81 and the hub 94 of the fan and is secured in keyed position relative thereto by a nut 98.

The bearing support 87 provides a housing for the gear 86 and a gear 99 in mesh therewith and mounted on a shaft 100 suitably journalled in bearings 101 and having an extension connected by a coupling 116 with the shaft 69 as hereinafter described and as shown in Figs. 12 and 13. The extended end 84 of the shaft 78 carries a drive pulley 103 adapted to be connected by a belt 104 to an electric motor 105 or any other suitable source of power as shown in Fig. 1.

With the cutter assembly and drive above described it will be noted that taking off the nut 98 and collar 95 and the nuts for the studs 90 and shifting the key of one of the washers out of register with the key slot 92 and into line with the other keys permits the shaft 78 to be removed longitudinally from the sleeve 81 and out of the machine, with the bearing support 87, whereby the cutter or beater assembly may then be taken out of the machine through the opening 29, rails 106 being secured to the sides of the housing and upon which the tubular end portions of the cutter assembly ride during its removal from the machine. Thus the objections and difficulties frequently encountered with the usual split form of casing have been eliminated.

The screen 71 is made in two substantially equal sections 71' which are mounted at each end between curved supports 107 secured to the side plates 21 and from which said sections are slidably removable, the inner section abutting against stops 108 and the outer edge 109 of the outer section being engageable with the door 30 whereby said screens are held against movement. Owing to the absence of a split housing the screen extends considerably more than half way around the circumferential path of movement of the beater so that a considerable increase in the capacity of the machine is obtained.

In Fig. 2 a scraper blade 110 of yieldable material is shown secured to the upper edge of the plate 23 and bearing upon the conveyor 40, so as to prevent material being carried outside of the machine.

Deflector plates 111 are also provided to form, with the end plates and bottom of the housing, a hopper 112 which is connected by a conduit 113 with the fan casing 114 which is provided with a removable cover section 115 in order to provide access to the nut 98 and washer 95. The fan casing 114 connects with a discharge conduit 114' so that material discharged through the screen 71 into the hopper 112 is carried by said fan through conduit 113 to the conduit 114' and from thence to a suitable place of discharge.

The shaft 69 is driven from the shaft 100 by a direct connection therewith through a coupling 116 provided with a longitudinally extending key 117 engageable with the keyway 118 in the shaft 100 and a similar keyway 119 in the shaft 69 and held in operative position by a set-screw 120, it being noted that loosening the screw 120 and slipping the coupling 116 down out of keyed engagement with the shaft 69 permits the removal of the bearing support 87 and shaft 78, as previously described.

Power being applied through pulley 103 to the shaft 78 this shaft is continuously rotated and will through gears 86 and 99 continuously rotate shaft 100 and hence shaft 69.

Referring to Figs. 7 to 11, inclusive, the shaft 69 extends through the housing 45 and is suitably supported and mounted in ball bearing journals 121 and is driven continuously while the machine is in operation, whereby the entire length of the shaft 69 runs continuously. The worm gear 47 for driving the conveyor 40 through gear 46 and shaft 43 is, however, loose on said shaft and adapted to be connected thereto when the cutters reach the desired working speed by means of a governor-operated clutch.

This clutch includes a tubular member 122 having a collar portion 122' provided with diametrically disposed keys 123 engaging in key slots 124 in the gear 47 and a tubular portion provided with slots 125 and forming yieldable clutch sections 136. This member 122 and the worm 47 are mounted on the shaft 69 between journals 127.

An inertia governor or speed-responsive device includes a spider whose hub 128 is secured to the shaft 69 by a pin 129 and whose diametrically disposed spaced arms 130 have the governor weight arms 131 mounted therebetween on a pin 132. Tensioning springs 133 for the arms 131 are mounted on a rod 134 pinned to the shaft 69 and interposed between said arms and an adjusting nut 135. At their lower ends the arms 131 have faces 136 which, as said arms swing out under the action of centrifugal force, are adapted to engage and press inwardly on the yieldable sections 126 of the clutch member 122 and thus cause it to be clamped to the shaft 69 and thence, through the key connection 123, 124, drive the worm 47 which in turn drives the conveyor, as previously described. Thus, if the machine becomes clogged and the cutter shaft 69 drops below a certain predetermined, efficient cutting speed the governor arms 131 move free of the clutch member 122 and thus release it from driven engagement with the shaft 69 and thus stops the feed of material to the machine until the machine again reaches the desired working speed, at which time the governor acts to throw in the feeding drive, as above described.

Aside from the particular features above pointed out, the general operation of the machine is the same as other machines of this general type, it being noted that the cutter 64 is particularly employed when cutting hay or other like material for fodder. It is also to be noted that the beater members 72 are angularly disposed relative to each other and while frictionally held to the drive shaft, through the pressure of the washers 74, may move angularly relative thereto if they strike a stone or other hard object that may have become mixed with the material being treated. These members 72 cooperate with the screens 71 in a well known manner, causing the material to be cut or broken and thus forced through the screen in a finely or coarsely divided condition, depending upon the material and the mesh of screen. While the members 72 have a hammer action, the invention is not to be limited to any particular form of hammer or cutter member as the manner of assembling these parts and the mounting of the assembly in the housing of the machine is applicable to other forms of blading then that shown.

I, therefore, desire it to be understood that this invention is not to be limited to any particular form or arrangement of parts except insofar as such limitations are specified in the claims.

What I claim as my invention is:

1. The combination with a drive shaft having a keyway therein, of a feed reducer assembly comprising a tubular shaft fitting over said drive shaft and having a longitudinally extending slot, blades mounted on said tubular shaft, spacing means interposed between said blades and provided with projections extending through said slot and into the keyway in said shaft.

2. The combination with a drive shaft having a keyway therein, of a feed reducer assembly comprising a tubular shaft fitting over said drive shaft and having a longitudinally extending slot, blades mounted on said tubular shaft, spacing means interposed between said blades and provided with projections extending through said slot and into the keyway in said shaft, said drive shaft having a transverse key-slot therein engageable with a key of one of the spacing means to hold said assembly against longitudinal movement relative to said shaft.

3. In a feed mill, the combination with a housing, of feed reducing units removably mounted therein, drive shafts for said units, a transmission mechanism including shafts and gearing whereby the drive of one shaft is transmitted to the other, and a releasable coupling between shafts of said transmission mechanism whereby either unit may be removed independent of the other.

RICHARD STRESAU.